(12) United States Patent
Zimmerman

(10) Patent No.: US 7,296,807 B2
(45) Date of Patent: Nov. 20, 2007

(54) EASY DUMPING CART

(76) Inventor: Felton Zimmerman, 4621 Deerwalk Ave., Tampa, FL (US) 33624

( * ) Notice: Subject to any disclaimer, the term of this patent is extended or adjusted under 35 U.S.C. 154(b) by 340 days.

(21) Appl. No.: 11/059,267

(22) Filed: Feb. 16, 2005

(65) Prior Publication Data

US 2005/0146102 A1 Jul. 7, 2005

Related U.S. Application Data

(63) Continuation-in-part of application No. 10/348,679, filed on Jan. 22, 2003, now Pat. No. 6,886,838.

(51) Int. Cl.
*B62B 1/24* (2006.01)

(52) U.S. Cl. .............. 280/47.32; 280/47.31; 298/3

(58) Field of Classification Search ............ 280/47.31, 280/47.32, 653, 33.996; 298/3
See application file for complete search history.

(56) References Cited

U.S. PATENT DOCUMENTS

| | | | | | |
|---|---|---|---|---|---|
| 1,032,009 | A | * | 7/1912 | Long ............................. | 298/3 |
| 1,261,532 | A | * | 4/1918 | Hoe ............................. | 298/3 |
| 1,590,000 | A | * | 6/1926 | Trowe ............................. | 298/3 |
| 1,804,403 | A | * | 5/1931 | Dowling ..................... | 37/434 |
| 2,037,222 | A | * | 4/1936 | Farrar ............................. | 298/3 |
| 2,544,505 | A | * | 3/1951 | Kronhaus .................. | 414/554 |
| 2,852,304 | A | * | 9/1958 | Harrison ....................... | 298/3 |
| 2,973,224 | A | * | 2/1961 | Wall ............................. | 298/3 |
| 3,092,418 | A | * | 6/1963 | Themascus .................... | 298/3 |
| 4,270,786 | A | * | 6/1981 | Mattox ........................ | 298/3 |
| 4,471,996 | A | * | 9/1984 | Primeau ....................... | 298/3 |
| 4,789,171 | A | * | 12/1988 | Porter ..................... | 280/47.18 |
| 4,921,305 | A | * | 5/1990 | Steer ............................. | 298/3 |
| 5,121,970 | A | * | 6/1992 | Andersen ...................... | 298/3 |
| 5,350,030 | A | * | 9/1994 | Mawhinney et al. ....... | 180/19.3 |
| 5,372,376 | A | * | 12/1994 | Pharaoh ..................... | 280/653 |
| 6,193,319 | B1 | * | 2/2001 | Kielinski ...................... | 298/2 |
| 6,390,496 | B1 | * | 5/2002 | Eicher ....................... | 280/653 |
| 6,755,478 | B2 | * | 6/2004 | Messinger-Rapport ......... | 298/3 |
| 6,886,838 | B1 | * | 5/2005 | Zimmerman ............ | 280/47.31 |
| 2002/0113389 | A1 | * | 8/2002 | Robinson ................. | 280/47.31 |

\* cited by examiner

*Primary Examiner*—Jeff Restifo
(74) *Attorney, Agent, or Firm*—Philip M. Weiss; Weiss & Weiss

(57) ABSTRACT

The use of a pivotal coupling on a cart of the wheelbarrow type allows for a downwardly applied pressure to the user ends of the handles to tip the bucket to at least begin the dumping action of the cart. Following the initial downward pressure with the handles still elevationally displaced downward an upward lift applied to the user ends of the handles completes the dumping action of the cart. Use of multiple pivotal axises on the cart provide for an extremely efficient operation. Various enhancements are explained including locking of the orientation of the cart following the initial dump, wheel blocking to prevent rotation of the ground support wheel relative to the bucket during at least a portion of the final dumping action and stabilization enhancement to prevent lateral tipping of the cart during the final dumping action.

7 Claims, 12 Drawing Sheets

EASY DUMPING CART

RELATED APPLICATIONS

This application is a continuation-in-part of U.S. patent application Ser. No. 10/348,679 filed Jan. 22, 2003 now U.S. Pat. No. 6,886,838.

BACKGROUND

1. Field of the Invention

The invention relates to carts capable of being manually manipulated by a person and manually dumped. More specifically, the invention relates to such carts, which may be dumped utilizing a combination of a downwardly applied pressure on a handle assembly and an upwardly applied pressure on the handle assembly or dumping by an upward applied pressure on the handle assembly.

2. Description of the Prior Art

Numerous types of carts exist which have a wheel or wheels, a container and a handle assembly where the cart can be manually manipulated by a person and manually dumped. A classic example of such a cart is a wheel-barrow which typically has a single front wheel, opposing handles which extend from the front wheel rearward, support legs extending downward from the handle and a bucket fixedly attached to the top of the handles. Millions of such carts have been produced for domestic use in the United States. In use the wheelbarrow typically rests on the ground at the front wheel and the support legs when not being manipulated by a person. From this position the bucket of the wheelbarrow may be loaded. When the wheelbarrow is to be moved from one position to another the person grips the handles distal from the front wheel and raises the handles to raise the support legs off of the ground. At this point the wheelbarrow is supported by the front wheel and the person manipulating the handles. When a dumping of the contents of the bucket is desired, without regard for whether the support legs are in contact with the ground or elevated above the ground for movement of the wheelbarrow, the person raises the handles to angularly tip the wheelbarrow up. This operation is performed countless times each day by construction workers as well as casual users. Despite the fact that this operation is routinely performed it remains an awkward operation to perform. First the hands move upward while lifting the handles up in a pulling action then a transfer occurs where the person's grip on the handles shifts and then the person applies a pushing action upward to the handles. This operation is performed while balancing the weight of the wheelbarrow and the contents of the bucket across the opposing handles while stepping toward the wheel and on the single front wheel.

Various innovations have been made to wheelbarrow designs to make the above dumping operation more controllable. A first class of innovations involves increasing the stability of the front wheel by either providing for a wider wheel or providing for opposing spaced adjacent wheels. Another class of innovations involves providing unique angular arrangement of at least the grip portion of the handles. Another class of innovations is known in the art for a more controllable dumping which involve providing for a downward pressure to be applied to the handles to perform the dumping procedure while the support legs remain in contact with the ground during the entire dumping procedure. Two examples of such designs appear in U.S. Pat. No. 1,032,009 to Long in 1912 and U.S. Pat. No. 2,037,222 to Farrar in 1935. Both of these designs have leg supports, which are fixedly positioned relative to their respective front wheels.

Various deficiencies exist with the known designs for carts of the wheelbarrow type. As can be seen various attempts have been made to provide for a more controllable dumping operation of wheelbarrows. These attempts have been less efficient than desired. As such, it may be appreciated that there continues to be a need for a cart design, which provide for performance of a dumping operation, which may be easily, safely and comfortably performed. The present invention substantially fulfills these needs.

SUMMARY

In view of the foregoing disadvantages inherent in the known types of carts, the present invention relates to a cart for easy dumping which utilizes a downward pressure applied by a user. The cart has a handle assembly, a wheel assembly, a ground contacting assembly and a pivotal coupling. The handle assembly has a user manipulation end and a distal end. The wheel assembly has a ground support wheel, which has a rotational axis. The wheel assembly also has a bucket fixedly positioned relative to the rotational axis of the ground support wheel. The ground contacting assembly contacts the ground while the cart is in a resting orientation and provides for a leveraging when the downward pressure is applied to the handle assembly at the user manipulation end. The pivotal coupling provides for a pivoting of the handle assembly relative to select portions of the cart to apply an upward pressure to the wheel assembly in close proximity to the bucket when the downward pressure is applied to the handle assembly at the user manipulation end. The upward pressure applied to the wheel assembly utilizes a cooperation between the ground contacting assembly and the pivotal coupling where the bucket is easily dumped forward away from the user manipulation end of the handle assembly.

It is an object of the present invention to provide for a cart which may be dumped utilizing a combination of a downward push to the handle assembly followed by an upward lift to the handle assembly or by an upward thrust on the handle assembly to toss the load.

Other objects include;

(a) to provide for the bucket of the cart to be in a tipped position following the initial downward push applied to the handle assembly or a dumped position following the initial upward thrust applied to the handle assembly.

(b) to provide for a reduction in stress related injuries, including back injuries, which currently result from dumping operations of conventional fixed frame design wheelbarrows.

(c) to provide for replacement of a biasing point behind a center of balance plane of the bucket of the cart where relatively light downward pressure is required to be applied to the handle assembly to perform the initial dumping operation.

(d) to provide for an initial placement of the bucket following the initial dumping operation which utilized the downward pressure where relatively light upward pressure is required to be applied to the handle assembly to perform the final dumping operation.

(e) to provide for a locking device to retain the cart in a dumping orientation while the upward pressure is applied to the handle assembly during performance of the final dumping operation.

(f) to provide for wheel rotation blocking device to prevent rotation of the ground support wheel relative to the bucket at least during a portion of the final dumping operation.

(g) to provide for the rotation axis of the ground support wheel to move toward the ground contact portion of the ground contacting assembly during at least a portion of the initial dumping operation when the downward pressure is applied to the handle assembly.

(h) to provide for a single pivotal axis extending laterally across the cart to provide for the structural displacement during the initial dumping operation when the downward pressure is applied to the handle assembly.

(i) to provide for two spaced pivotal axises each extending laterally across the cart to provide for the structural displacement during the initial dumping operation when the downward pressure is applied to the handle assembly.

The present invention relates to a system and method for tossing or ejecting a product from a cart or wheelbarrow. When the cart is moved from one position to a further position, a person grips the handles distal from the front wheel and raises the handles which raise the support legs of the cart off the ground. At this point, the cart is supported by the front wheel and the person manipulating the handles. When a person wishes to dump the contents of the bucket, the person can thrust the handles up angularly tipping the cart upward. The separation of the handle assembly and the bucket assembly occurs as the bucket assembly and its contents continue to follow the direction of the momentum over the balancing axis point of the cart ending up at the final dumping orientation. The dumping is done without regard for whether the support legs are in contact with the ground or elevated above the ground for movement of the cart.

At this dumping orientation, the leveraged locking mechanism has been released and the contents have been dumped. Pulling back on the handles brings the wheel-bucket assembly back over the balancing axis point bringing the wheel-bucket assembly and the handle assembly back together.

It is an object of the present invention to further provide a system and method for incline dumping of a cart or wheel-barrow at an incline, the balancing axis point of the cart and the center of gravity are closer together, making the wheel-bucket assembly easier for tipping. When a dumping of the contents of the bucket is desired, a person can thrust the handles up angularly, tipping the cart upward. The separation of the handle assembly and the wheel-bucket assembly occurs as the wheel-bucket assembly and its contents continue to follow the direction of the momentum over the balancing axis point of the cart ending up at the final dumping orientation. The dumping is done without regard for whether the support legs are in contact with the ground or elevated above the ground for movement of the cart.

At this dumping orientation, the leverage locking mechanism has been released and the contents have been dumped. Pulling back on the handles brings the wheel-bucket back over the balancing axis point bringing the wheel-bucket assembly and the handle assembly back together.

It is an object of the present invention to provide a system and method for dumping a load from a cart by pushing down the handles of the cart. Pushing down on the handles causes a leveraging to occur in the handle assembly. The front end of the handle assembly pushes up toward the rear of the wheel-bucket assembly while pushing down and pivoting on the rear ground supporting couplings. By pivoting the arm assembly up and down, this pushes down on the rear ground support couplings causing the ground support to rock back toward the rear which causes a pushing up on the forward ground support couplings located near the center of the wheel-bucket assembly.

The ground support assembly has a pressure bearing point of contact with the ground close to the center of gravity of the load and a curved bracket at the bottom that extends upward laterally toward the handles. When the curved bracket is provided a pressure bearing axis of the ground contacting assembly, it typically will move along the curve back toward the handles when the downward pressure is applied to the handle assembly at the user manipulation end. The extension of the curved bracket keeps the handles higher off the ground which also contributes in raising the cart assembly higher at the rear.

During the initial downward pushing of the handles, the front end pivots upward from the ground supports' rear coupling, pushing up on the linkage coupling which connects to the cart assembly. This causes a division between the wheel-bucket assembly and the hand assembly to occur. The length of the linkage determines the expansion of the arc.

As the bucket tips forward after the initial pushing down on the handles, a transferring starts to occur over the axis of the wheel. The weight begins to become displaced. In the leveraged position, the displacement has made the weight lighter on the user end. The center of gravity of the load has moved toward the axis of the wheel. This combined with the downward angle of the handles make the leveraging easier for the final dumping procedure.

The present invention relates to a system and method for lifting from a dumping position. In a crouched lifting position, after the initial downward push on the handles, a person's legs will be bent, back straight, and arms extended downward holding the ends of the handles. As a person's legs are stretched out to lift the heaviest part of the load to their waist area, the weight diminishes from the load on the user side of the axis of the wheel due to the displacement of the load that crosses over the balancing axis point where the tipping takes place. This operation is performed while balancing the weight of the cart and the contents of the bucket across opposing handles on the wheel or wheels having both feet stationed on the ground.

In a standing position, after the initial lifting from a crouched position up to a person's waist area, the leverage load weight has diminished substantially due to the increased displacement of the load that crossed over the balancing axis point of the cart making it easier for a person's arms to lift the remaining part of the load over the balancing axis point to a dump position.

During the final dumping action, a fulcrum transfer occurs between the axis of ground bearing wheel and the nose of the wheel-bucket assembly where the displacement of the load occurs. The nose of the wheel-bucket assembly now becomes the balancing axis point for the remaining dumping procedure. At this dumping orientation, the leveraged locking mechanism has been released and the contents have been dumped. Pulling back on the handles brings the wheel-bucket assembly back over the balancing axis point bringing the wheel-bucket assembly and the handle assembly back together.

It is an object of the present invention to be able to dump the contents of the cart in any direction.

It is an object of the present invention to provide a latching assembly between the bucket and the handle assembly.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Figure 1:
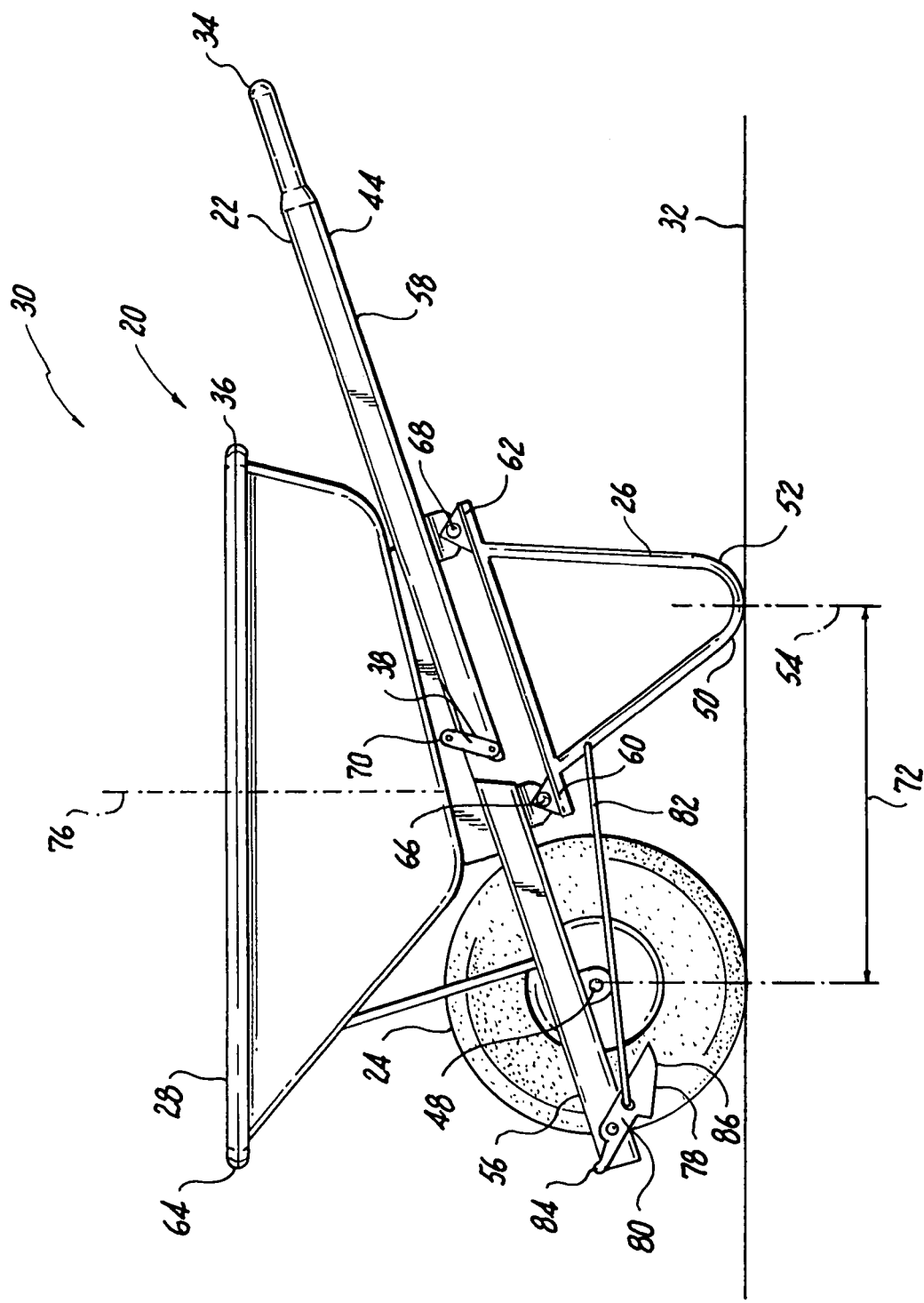
FIG. 1 is an elevational side view of a cart in a resting orientation.

Many different carts having features of the present invention are possible. The following description describes the preferred embodiment of select features of those carts and various combinations thereof. These features may be deployed in various combinations to arrive at various desired working configurations of carts.

Reference is hereafter made to the drawings where like reference numerals refer to like parts throughout the various views.

Carts having features of the present invention provide for an easy dumping of a load utilizing a downward pressure applied by a user to a handle assembly or an upward pressure applied by a user to the handle assembly. The momentum of the load tips the hopper over the wheel axis. The carts have a handle assembly, a ground support wheel, a ground contacting assembly and a bucket. The carts have a resting orientation where the cart is in a standard configuration and where loading of the cart may readily occur as conventionally known for standard carts. The carts have a longitudinal length aligned with a straight line of travel of the cart. The carts have a forward portion and rearward portion and opposing lateral sides. Suitable cross bracing at various positions on the cart, as conventionally known in the art, may be utilized to enhance structural integrity of the cart.

FIG. 1 depicts a cart 20 having a handle assembly 22, a ground support wheel 24, a ground contacting assembly 26 and a bucket 28 and positioned in a resting orientation 30 on a ground surface 32.

A method of use provides for a user to dump a cart using the steps of providing a cart having features of the present invention. Then positioning the cart in a starting position with the bucket generally level and the ground contacting assembly in contact with the ground and the ground support wheel in contact with the ground. Then applying a downward pressure to the user manipulation end of the handle assembly of the cart wherein the user manipulation end of the handle assembly moves downward and the bucket pivots upward at the rearward extremity relative to the ground contacting assembly and the bucket pivots downward at the forward extremity until the locking device locks the handle assembly in the leveraged position relative to the ground contacting assembly. Then applying an upward pressure to the user manipulation end of the handle assembly of the cart wherein the bucket angularly tips up at the rearward extremity to a dumping orientation by which point the locking device releases the handle assembly. Then moving the user manipulation end of the handle assembly of the cart downward to return the cart to the starting position. The handle assembly returns to the standard position from the leveraged position. The locking device can be in several different arrangements including ratchet, sliding, binding and telescopic.

Figure 2:
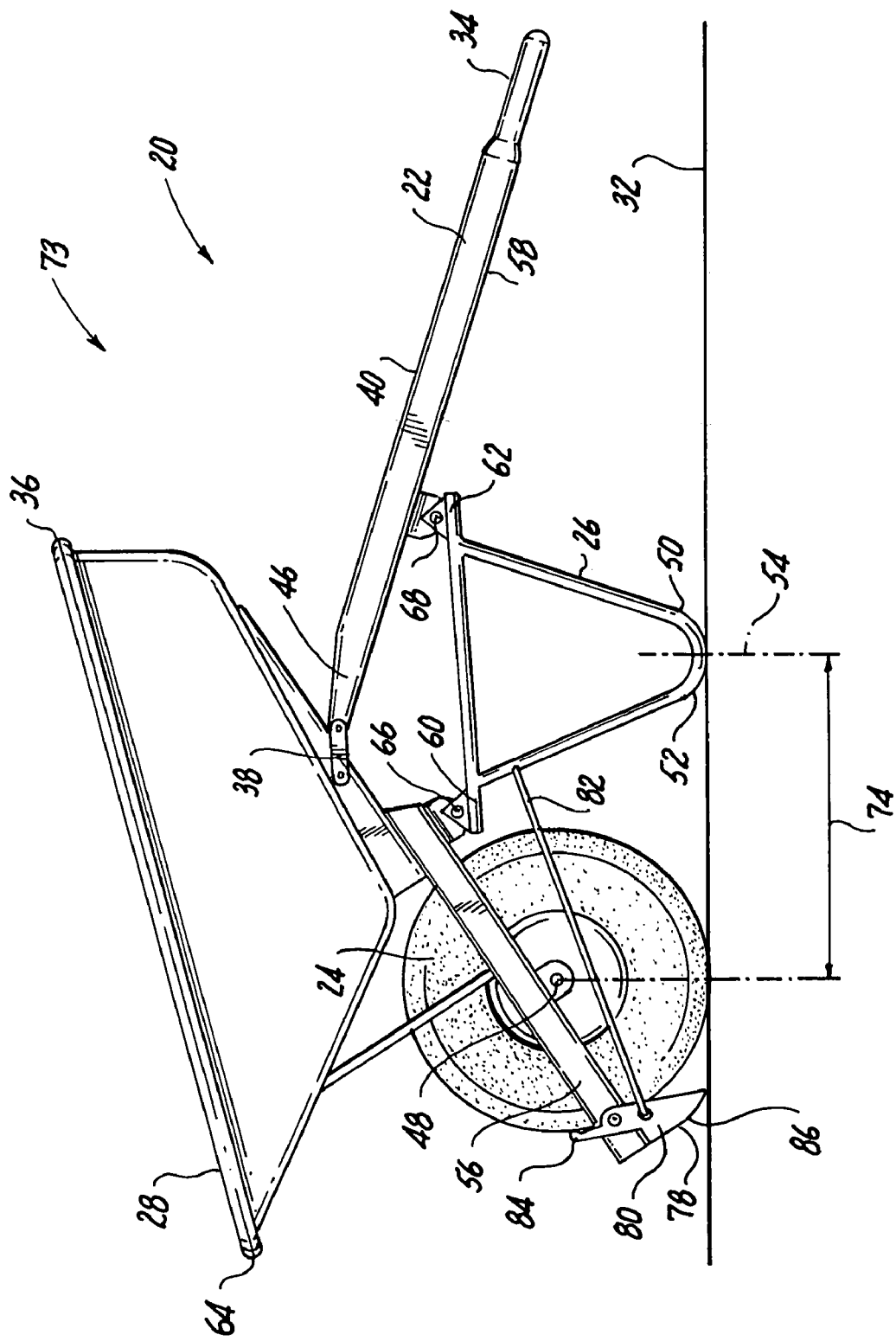
FIG. 2 is an elevational side view of the cart shown in FIG. 1 and in an initial dumping orientation.
Figure 3:
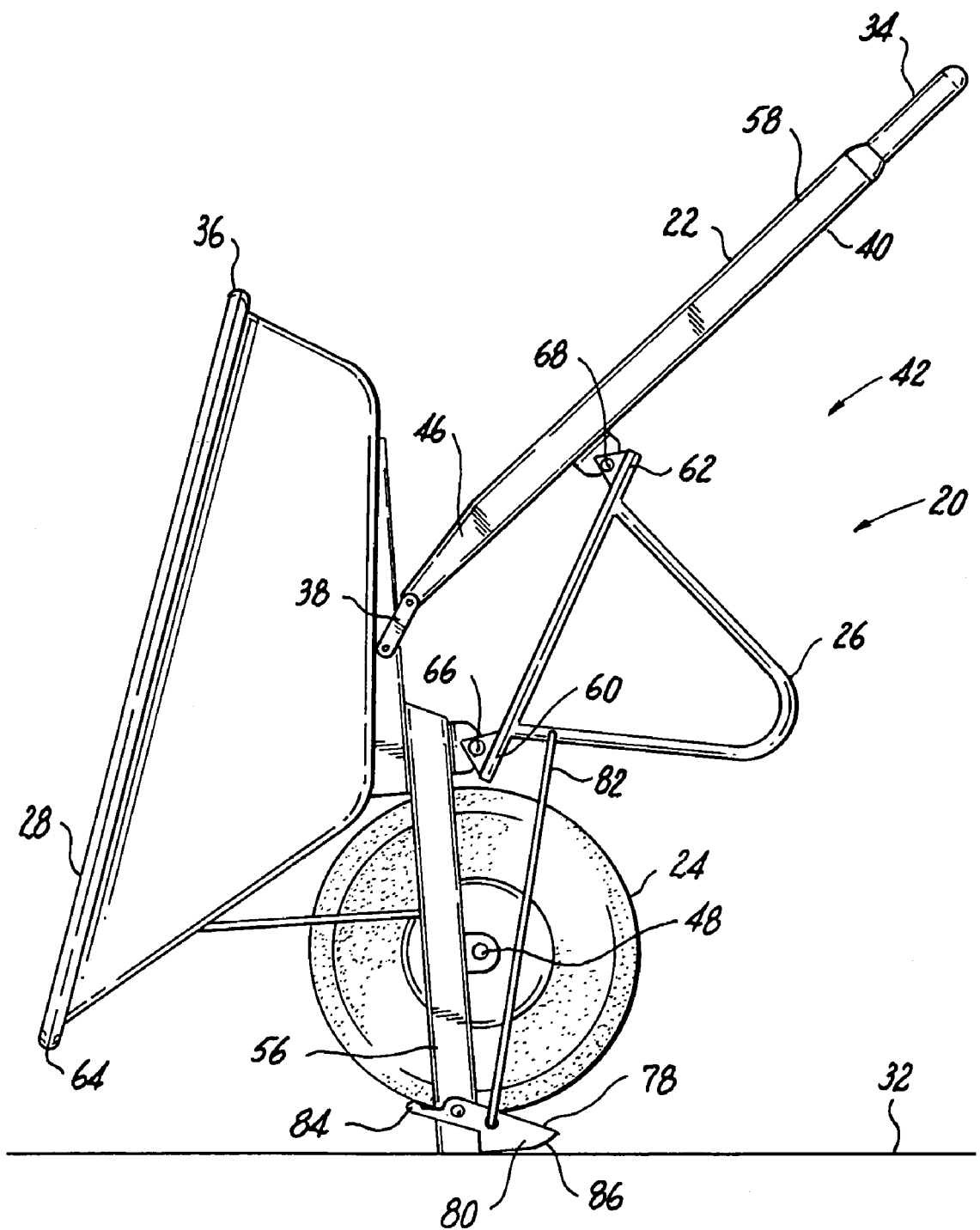
FIG. 3 is an elevational side view of the cart shown in FIG. 1 and FIG. 2 and in a final dumping orientation.

FIG. 1 through FIG. 3 depicts various steps of use of cart 20. FIG. 1 depicts cart 20 positioned in a starting position with bucket 28 generally level and ground contacting assembly 26 and ground support wheel 24 in contact with ground surface 32. The change depicted from FIG. 1 to FIG. 2 depicts the change subsequent to the applying of a downward pressure to a user manipulation end 34 of handle assembly 22. User manipulation end 34 of handle assembly 22 has moved downward and bucket 28 has pivoted upward at a rearward extremity 36 relative to ground contacting assembly 26. An arcing coupling 38 has locked handle assembly 22 in a leveraged position 40 relative to ground contacting assembly 26. The change depicted from FIG. 2 to FIG. 3 depicts the change subsequent to applying an upward pressure to user manipulation end 34 of handle assembly 22. Bucket 28 has angularly tipped up at rearward extremity 36 to a final dumping orientation 42. During at least a portion of this movement arcing coupling 38 has retained handle assembly 22 in leveraged position 40 relative to ground contacting assembly 26. The change depicted from FIG. 3 to FIG. 1 depicts the change subsequent to moving user manipulation end 34 of handle assembly 22 downward to return cart 20 to the starting position. By this point arcing coupling 38 has released handle assembly 22 to return handle assembly 22 to a standard position 44 from leveraged position 40.

The handle assembly has a user manipulation end for manipulation by the user and a distal end opposing the user manipulation end. The handle assembly has a standard position corresponding to the cart's resting orientation. The handle assembly may take many forms with a preferred arrangement of a pair of symmetrically disposed opposing arms positioned on opposing lateral sides of the cart.

FIG. 1 depicts handle assembly 22 having user manipulation end 34 and a distal end 46 opposing user manipulation end 34. Handle assembly 22 is depicted in standard position 44 corresponding to resting orientation 30.

The ground support wheel is in contact with the ground surface during much of the use of the cart. The ground support wheel has a rotational axis about which it rotates. While a single ground support wheel is preferred it is possible to provide for multiple ground support wheels adjacently positioned and sharing a common rotational axis.

FIG. 1 depicts ground support wheel 24 in contact with ground surface 32. Ground support wheel 24 has a rotational axis 48 about which it may rotate.

The ground contacting assembly contacts the ground while the cart is in the resting orientation and provides for leveraging means when the downward pressure is applied to the handle assembly at the user manipulation end. The ground contacting assembly has a ground contact portion, which makes contact with the ground surface during certain operations of the cart. The ground contacting assembly may take many forms but preferably will distribute the weight of the cart, and any load positioned thereon, to, or toward, the opposing lateral sides of the cart while the cart is in the resting orientation, as conventionally known for wheelbarrow type carts. The ground contact portion preferably has a curvature thereon where a rolling contact with the ground surface occurs during the initial dumping operation. When the curvature is provided a pressure-bearing axis of the ground contacting assembly typically will move along the ground contact portion when the downward pressure is applied to the handle assembly at the user manipulation end. The extension of the bracket determines the height of the handles and the tipping of the bucket.

In certain embodiments the ground contacting assembly takes the form of a coupling assembly having a ground contact portion, which preferably will also be laterally distributed across the cart. The coupling assembly spans from the forward portion of the cart having the ground support wheel and the bucket to the rearward portion of the cart having the handle assembly. The ground contacting assembly may have a first connection portion and a second connection portion with the first connection portion connected to the forward portion, the wheel assembly, and the second connection portion connected to the rearward portion, the handle assembly. The coupling assembly may be pivotally attached to the forward portion of the cart and pivotally attached to the rearward portion of the cart. Alternatively, the coupling assembly may be pivotally attached to either the forward portion or rearward portion and fixedly attached to the opposing portion. The ground contacting assembly may extend from the rearward portion having the handle assembly and not contact the forward portion of the cart.

As shown in FIG. 1 and FIG. 2 ground contacting assembly 26 contacts ground surface 32 and provides for a leveraging action to be applied by distal end 46 of handle assembly 22 relative to bucket 28 when the downward pressure is applied to user manipulation end 34. Ground contacting assembly 26 has a ground contact portion 50, which makes contact with ground surface 32. Ground contact portion 50 has a curvature 52 thereto which rolls along ground surface 32 during the initial dumping operation as depicted from FIG. 1 to FIG. 2. A pressure-bearing axis 54 moves during the movement of ground contacting assembly 26. Ground contacting assembly 26 is a coupling assembly, which spans from a forward portion 56 to a rearward portion 58. Forward portion 56 has ground support wheel 24 and bucket 28 while rearward portion 58 has handle assembly 22. Forward portion 56 is also known as a wheel assembly. Ground contacting assembly 26 has a first connection portion 60 and a second connection portion 62. First connection portion 60 and second connection portion 62 are pivotally attached to forward portion 56 and rearward portion 58 respectively.

The bucket is attached to the cart relative to the ground support wheel. Preferably the bucket is fixedly positioned on the cart relative to the rotational axis of the ground support wheel. The bucket has a rearward extremity distal from the ground support wheel and a forward extremity in closer proximity to the ground support wheel.

FIG. 1 depicts bucket 28 fixedly attached to cart 20 relative to rotational axis 48 of ground support wheel 24. Bucket 28 has rearward extremity 36 and a forward extremity 64.

It is possible to provide for the bucket to pivot from a position offset from the rotational axis of the ground support wheel to provide for the bucket to contact the ground support wheel to prevent rotation thereof at select times. Preferably the forward portion of the cart forms a wheel assembly having the ground support wheel and the bucket fixedly positioned thereon.

At least one pivotal coupling provides for a pivoting of the handle assembly relative to select portions of the cart. The pivotal coupling provides for a pivotal axis, which laterally extends across the cart. Many structural elements may be utilized to provide for such couplings with at least two (2) laterally spaced elements preferably being deployed. In a most preferred embodiment two (2) such pivotal axises are provided in spaced relationship along the longitudinal length of the cart. In these cases the coupling assembly may be provided with a first pivotal axis connecting the coupling assembly to the forward position, the wheel assembly, and with a second pivotal axis connecting the coupling assembly to the rearward portion, the handle assembly, to provide for a pivoting of the handle assembly relative to the remainder of the cart.

FIG. 1 through FIG. 3 depict a pivotal coupling 66 between ground contacting assembly 26 forward portion 56 and a pivotal coupling 68 between ground contacting assembly 26 and rearward portion 58.

A biasing device provides for the handle assembly, in close proximity to the distal end, to apply, or cause to be applied, an upward pressure relative to the bucket when the downward pressure is applied to the handle assembly at the user manipulation end. The leveraging provides for the bucket to easily dump forward away from the user manipulation end of the handle assembly. The biasing device acts with the ground contact portion of the ground contacting assembly or coupling assembly to provide the desired leverage relative to the bucket to cause the initial tipping of the bucket where the elevational relationship of the rearward extremity of the bucket moves upward relative to the forward extremity of the bucket. The biasing device employs many different structural arrangements. A sliding engagement, an arcing engagement, and a binding engagement are several structural arrangements. When a sliding engagement is utilized a track may restrict moving components to a desired path.

FIG. 1 through FIG. 3 depict handle assembly 22 applying an upward pressure 70, see FIG. 1, relative to bucket 28 through arcing coupling 38.

A locking device provides for a locking of the handle assembly relative to the bucket in a leveraged position subsequent to the initial dumping action resulting from the application of the downward pressure to the user manipulation end of the handle assembly. Many structural arrangements may be used to provide the desired locking of the handle assembly in the elevationally displaced position. The locking device provides for selectively retaining the forward portion, the wheel assembly, in a dumping orientation relative to the rearward portion, the handle assembly, subsequent to the downward pressure being applied to the handle assembly at the user manipulation end sufficient to displace the forward portion, the wheel assembly, including the bucket to the dumping orientation. A locking device may be provided to lock the cart in the resting orientation if desired such as where conventional use is desired or during transport.

FIG. 1 through FIG. 3 depict arcing coupling 38 which acts to lock handle assembly 22 in leveraged position 40 subsequent to the initial dumping action, see change from FIG. 1 to FIG. 2. This locking allows for handle assembly 22 to remain in leveraged position 40 during the final dumping action, see change from FIG. 2 to FIG. 3.

The rotational axis of the ground support wheel has a resting spacing relative to the ground contact portion of the ground contacting assembly at the ground surface when the cart is in the resting orientation. In use carts having features of the present invention operate based on one of two general principles. Under the first principle structures of the cart provide for the ground contacting assembly to remain at a uniform spacing relative to the rotational axis of the ground support wheel during the initial dumping operation. Under the second principle structures of the cart provide for the rotational axis of the ground support wheel to move toward the ground contacting assembly during the initial dumping operation. In this second more preferred arrangement the rotational axis of the ground support wheel has a dumping spacing relative to the ground contact portion of the ground contacting assembly subsequent to the downward pressure being applied to the handle assembly at the user manipulation end with the resting spacing greater than the dumping spacing.

FIG. 1 depicts a resting spacing 72 between rotational axis 48 and pressure-bearing axis 54 of ground contact portion 50 while cart 20 is in resting orientation 30. FIG. 2 depicts a dumping spacing 74 between rotational axis 48 and pressure-bearing axis 54 of ground contact portion 50 while cart 20 is in an initial dumping orientation 73. It is noted that resting spacing 72 is greater than dumping spacing 74.

The bucket has a center of balance positioned somewhere between the ground support wheel and the user manipulation end of the handle assembly. The center of balance is loosely determined based upon a uniform distribution of a typical load as would most likely be carried by the respective cart. The handle assembly has a leveraging position distal from the user manipulation end where the leveraging position acts upon the bucket during the initial dumping operation. Preferably the leveraging position of the handle assembly acts upon the bucket rearward, or on the user manipulation end of the handle assembly, side of the center of balance of the bucket during the applying of the downward pressure to the user manipulation end of the handle assembly.

FIG. 1 depicts a center of balance 76 of bucket 28. Upward pressure 70 is applied rearward, toward handle assembly 22, of center of balance 76.

Ground support wheel rotation blocking assembly provides for preventing rotation of the ground support wheel relative to the bucket during the applying of the upward pressure to the user manipulation end of the handle assembly. The application of upward pressure to the user manipulation end of the handle assembly occurs subsequent to the application of the downward pressure of the initial dumping action. During the application of the upward pressure the bucket angularly tips up at the rearward extremity to the dumping orientation. The ground support wheel rotation blocking assembly acts to prevent the cart from rolling during a portion of the dumping operation. Many structures are known in the art to provide for such blocking. The blocking may act upon some portion of the actual wheel or may act upon the axle bearing the wheel. A separate dedicated blocking member may be employed or a pivotal contact of the bucket with the wheel may be employed.

FIG. 1 through FIG. 3 depict a ground support wheel rotation blocking assembly 78 having a wedge portion 80 and a deployment coupling 82. When cart is transferred from resting orientation 30, see FIG. 1, to initial dumping orientation 73, see FIG. 2, deployment coupling 82 causes a pivotal displacement of wedge portion 80. Wedge portion 80 has a wheel engagement portion 84, which does not interfere with rotation of ground support wheel 24 when cart 20 is in resting orientation 30, see FIG. 1. When cart 20 is transferred to initial dumping orientation 73, see FIG. 2, wheel engagement portion 84 engages ground support wheel 24 and prevents rotation thereof until cart 20 released from initial dumping orientation 73 begins to return to resting orientation 30, see FIG. 1.

A stabilizing assembly may be positioned in close proximity to the ground support wheel to provide for contacting the ground surface in close proximity to the ground support wheel during some portion of the dumping procedure. Such an assembly may be employed to prevent the cart from rolling forward along the ground surface utilizing the ground support wheel and/or to laterally expand the contact area beyond that available by the ground support wheel to increase stability of the cart during the final dumping operation where the ground contacting assembly is raised off of the ground surface. Various arrangements may be employed including a fixed position arrangement. Preferably the stabilization assembly provides for a ground contacting portion to be elevationally displaced at least when the cart is being moved about to prevent inadvertent contact with the ground.

Wedge portion 80 of ground support wheel rotation blocking assembly 78 also has a ground contact surface 86 which is deployed when cart is transferred from resting orientation 30, see FIG. 1, to initial dumping orientation 73, see FIG. 2. Ground contact surface 86 is disposed on opposing sides of ground support wheel 24 to stabilize cart 20 during the final dumping operation, see change from FIG. 2 to FIG. 3.

Figure 4:
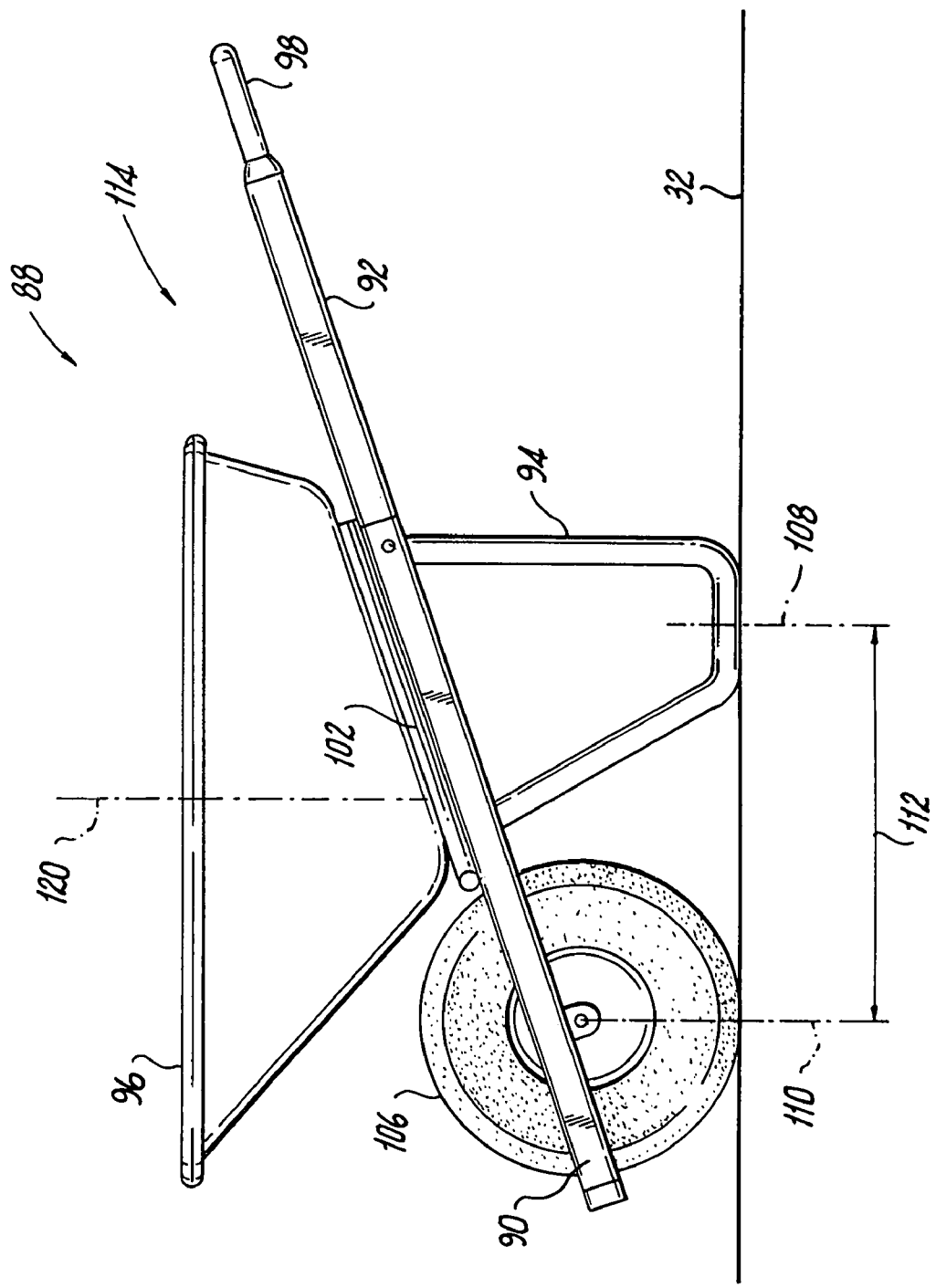
FIG. 4 is an elevational side view of another embodiment of a cart and in a resting orientation.
Figure 5:
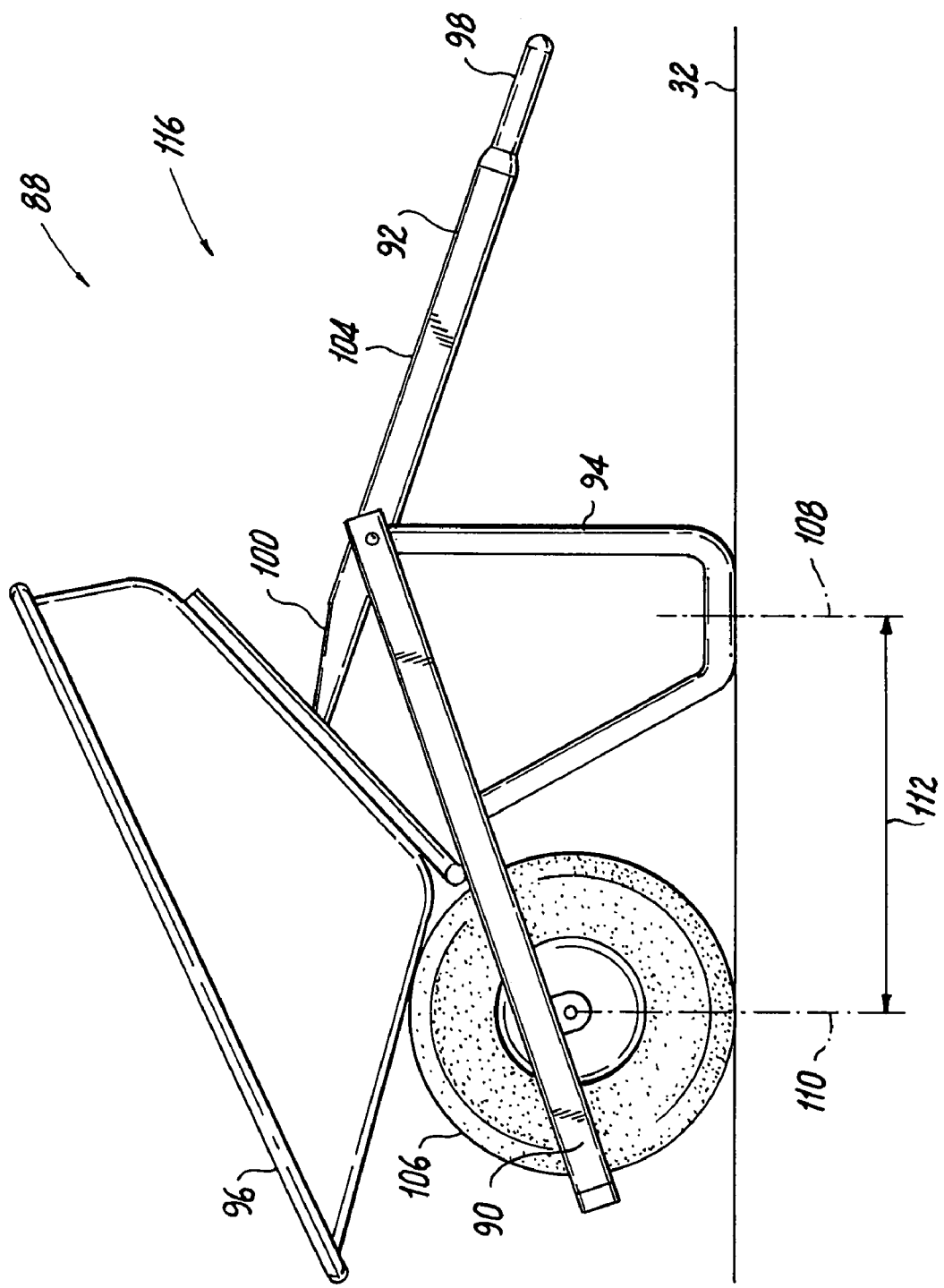
FIG. 5 is an elevational side view of the cart shown in FIG. 4 and in an initial dumping orientation.
Figure 6:
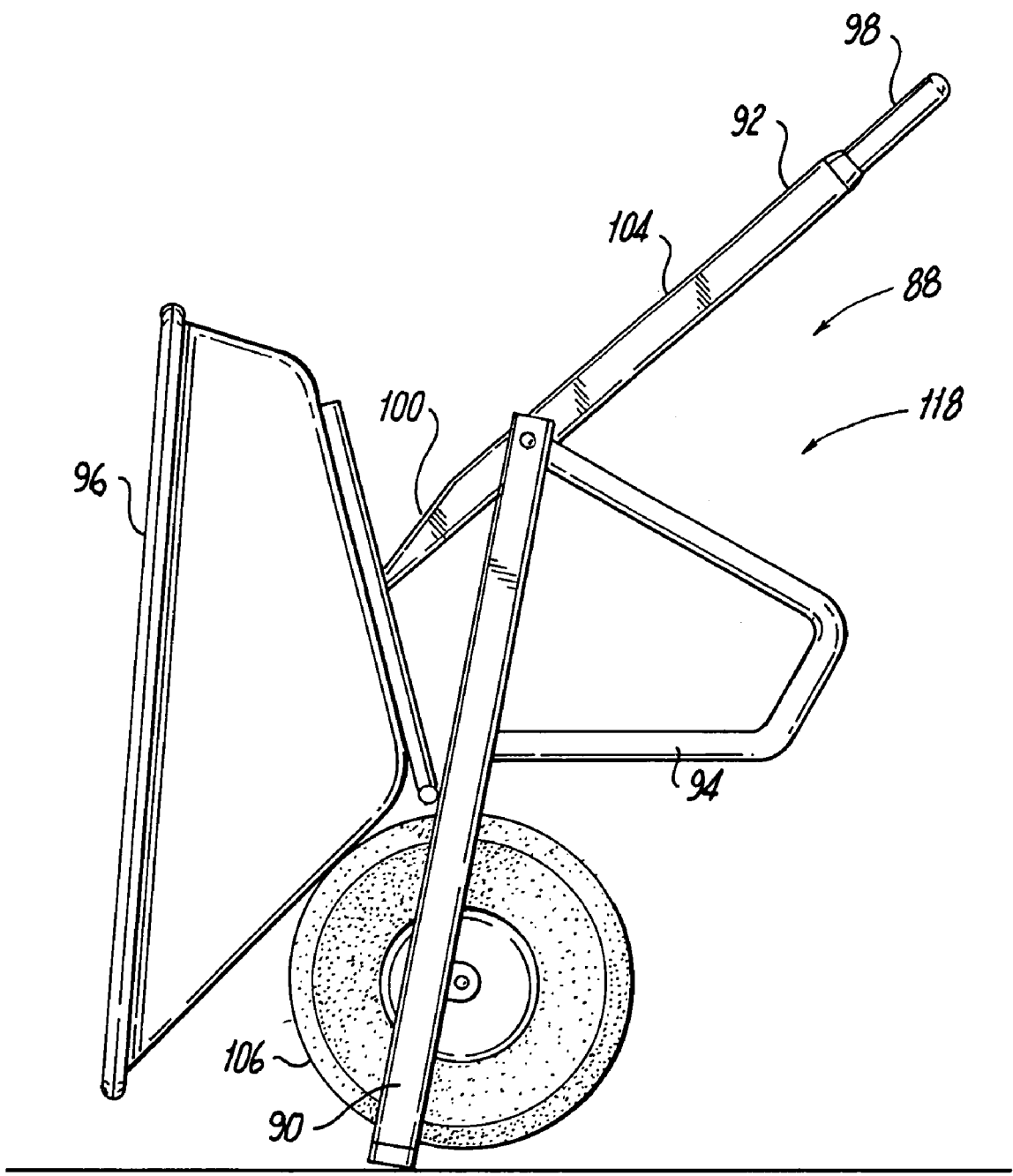
FIG. 6 is an elevational side view of the cart shown in FIG. 4 and FIG. 5 and in a final dumping orientation.

FIG. 4 through FIG. 6 depict a cart 88 having a wheel assembly 90 and a handle assembly 92. Wheel assembly 90 has a ground contacting assembly 94 attached thereto. Wheel assembly 90 also has a bucket 96 pivotally attached thereto. Handle assembly 92 is pivotally attached to wheel assembly 90 wherein a downward pressure on a user manipulation end 98 causes a pivotal displacement of a distal end 100. When handle assembly 92 is pivotally displaced, distal end 100 applies an upward pressure 102, see FIG. 4, relative to bucket 96 to tip bucket 96 upward.

During such displacement distal end 100 engages a slot, not shown, and locks in a leveraged position 104. While locked in leveraged position 104, bucket 96 bindingly engages a ground support wheel 106 to prevent rotation thereof. Ground contacting assembly 94 has a pressure bearing axis 108 relative to ground surface 32. Ground support wheel 106 has an axis of contact 110 relative to ground surface 32. Pressure bearing axis 108 and axis of contact 110 have a spacing 112 which remain stable during the pivotal displacement of bucket 96, see FIG. 4 and FIG. 5. FIG. 4 depicts cart 88 in a resting orientation 114. FIG. 5 depicts cart 88 in an initial dumping orientation 116. FIG. 6 depicts cart 88 in a final dumping orientation 118. Bucket 96 has a center of balance 120, see FIG.4, with upward pressure 102 being applied rearward from center of balance 120.

Figure 7:
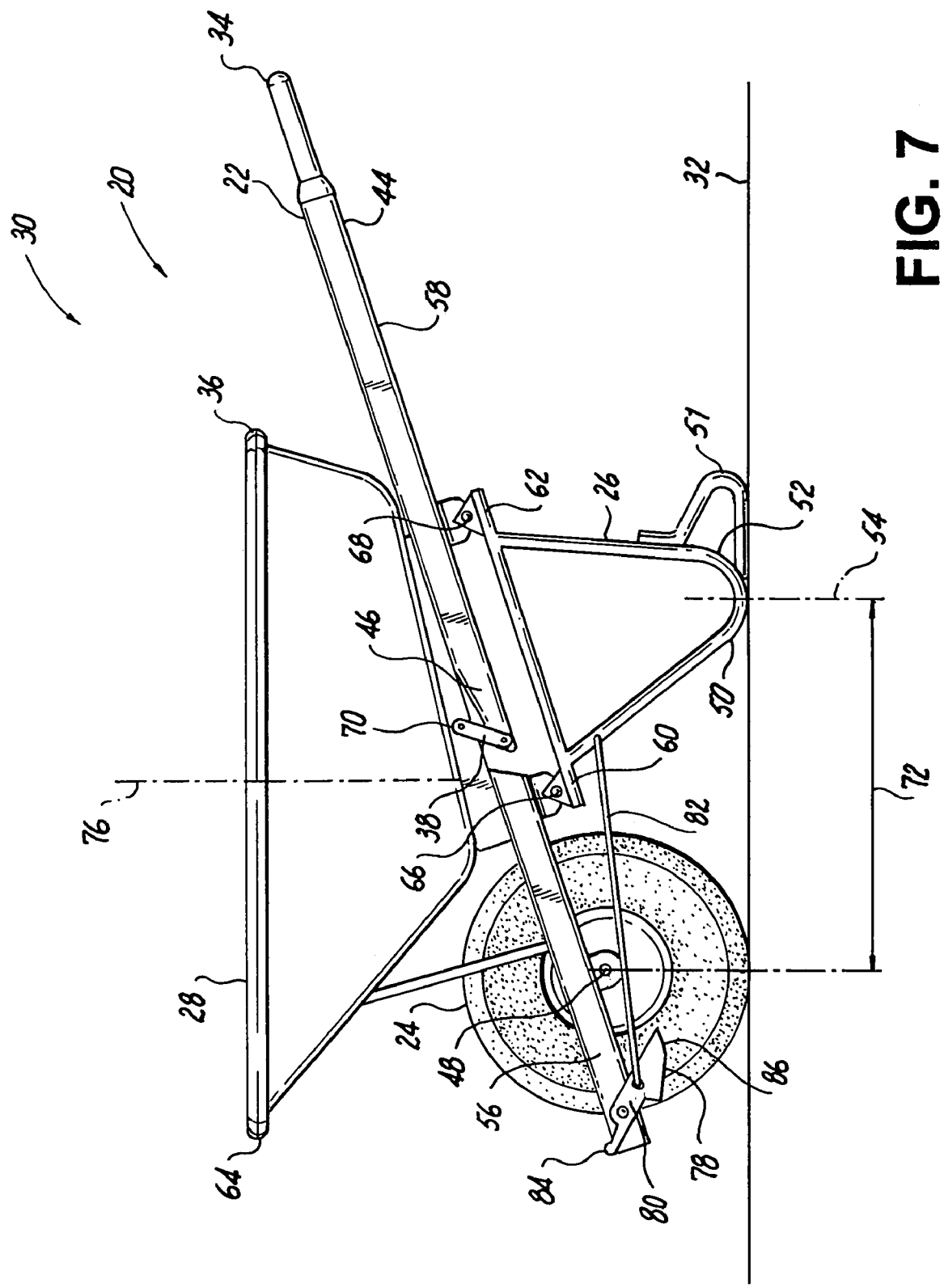
FIG. 7 is an elevational side view of a cart in a resting orientation.

FIG. 7 adds an additional bracket 51 which provides additional support for the cart 20.

FIG. 7 depicts a cart 20 having a handle assembly 22, a ground support wheel 24, a ground contacting assembly 26 and a bucket 28 positioned in a resting orientation 30 on a ground surface 32.

Figure 8:
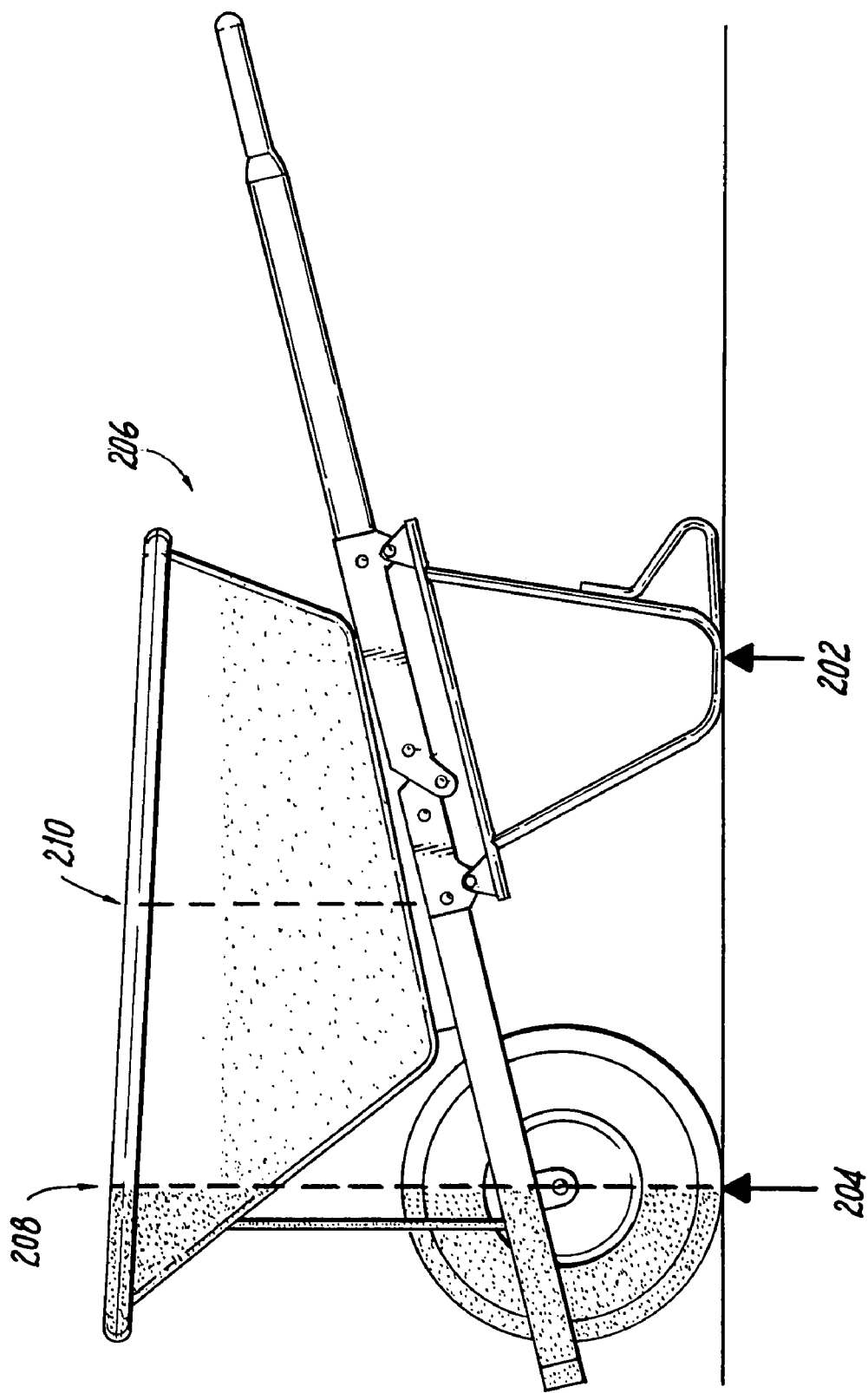
FIG. 8 is an elevational side view of a cart in a resting orientation.

A method of use provides for a user to dump a cart using the steps of providing a cart having features of the present invention. Then positioning the cart in a resting orientation as shown in FIG. 8, with the bucket 28 generally level and the ground contacting assembly 26 in contact with the ground and the ground support wheel 24 in contact with the ground. FIG. 8 shows ground bearing points 202 and 204. The load 206 is in the bucket 28. The cart has a break-over point 208 and a center of gravity for the bucket 28, 210.

Figure 9:
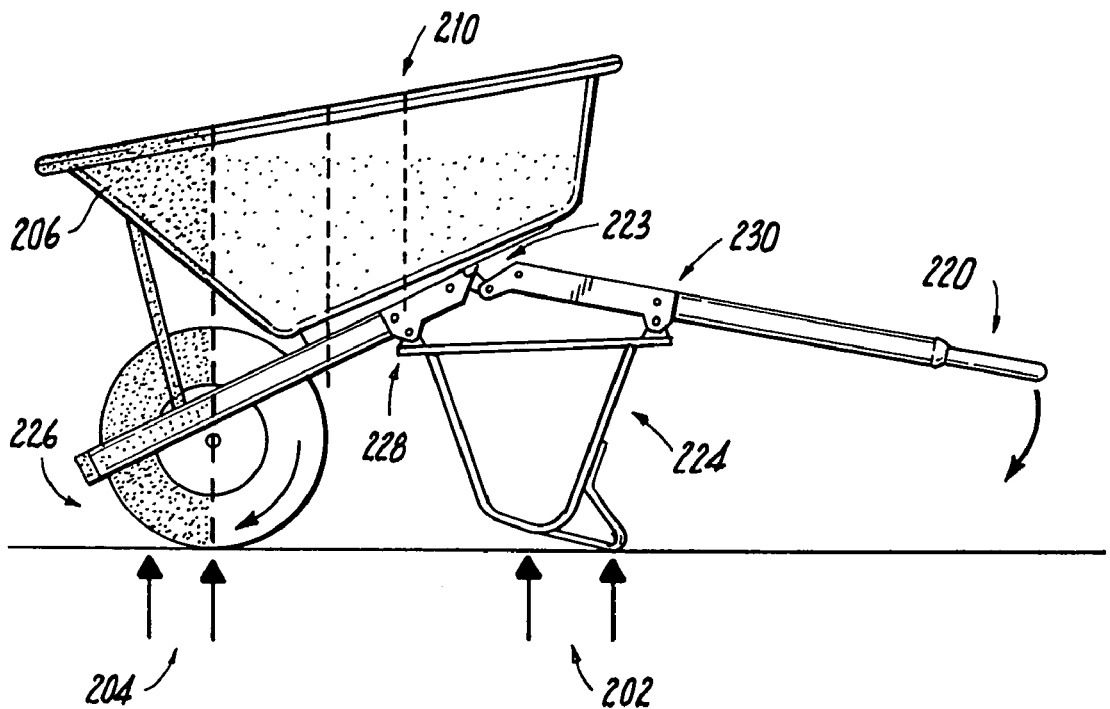
FIG. 9 is an elevational side view of the cart shown in FIG. 8 and in an initial dumping orientation.
Figure 10:
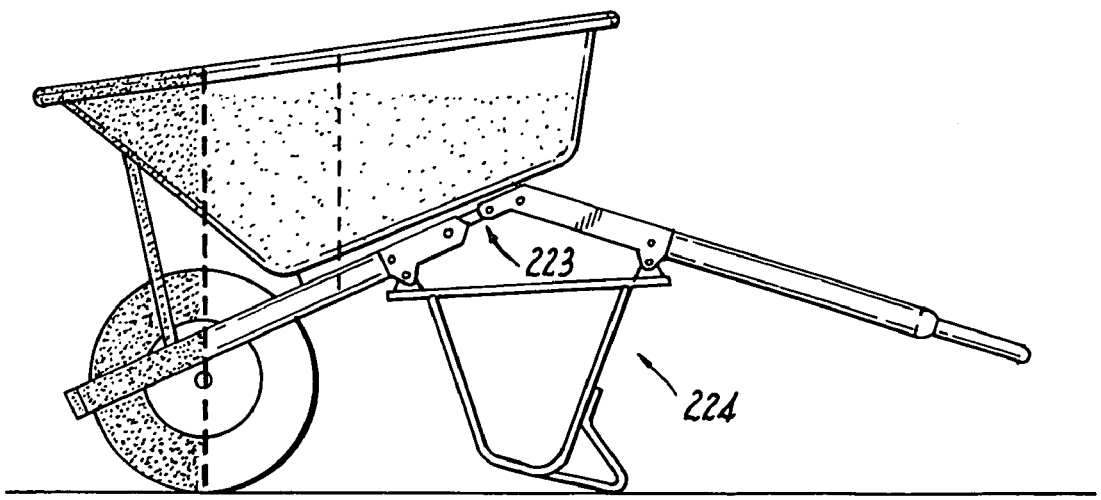
FIG. 10 is an elevational side view of the cart shown in FIG. 8 shown in a locked position.

FIG. 9 shows a side view of the cart shown in FIG. 8 with the cart in an initial dumping orientation. A person applies a downward pressure 220, 230 to the user manipulation end 34 of the handle assembly 22 of the cart 20 wherein the user manipulation end 34 of the handle assembly 22 moves downward and the bucket 28 pivots upward at the rearward extremity relative to the ground contacting assembly 26 and the bucket 28 pivots downward at the forward extremity until the locking device 223 locks the handle assembly 22 in the leveraged position relative to the ground contacting assembly 26. FIG. 9 shows the original center of gravity 210, which has now shifted to position 222. Load 206 has shifted forward in the bucket 28. Ground bearing points 204 and 202 have also shifted. Arrow 224 shows how the cart rocks back during this step. Arrow 226 shows how the cart rolls back during this step. Arrow 228 shows how the cart is pushed up. FIG. 10 shows that the locking device 223 has now locked.

Figure 11:
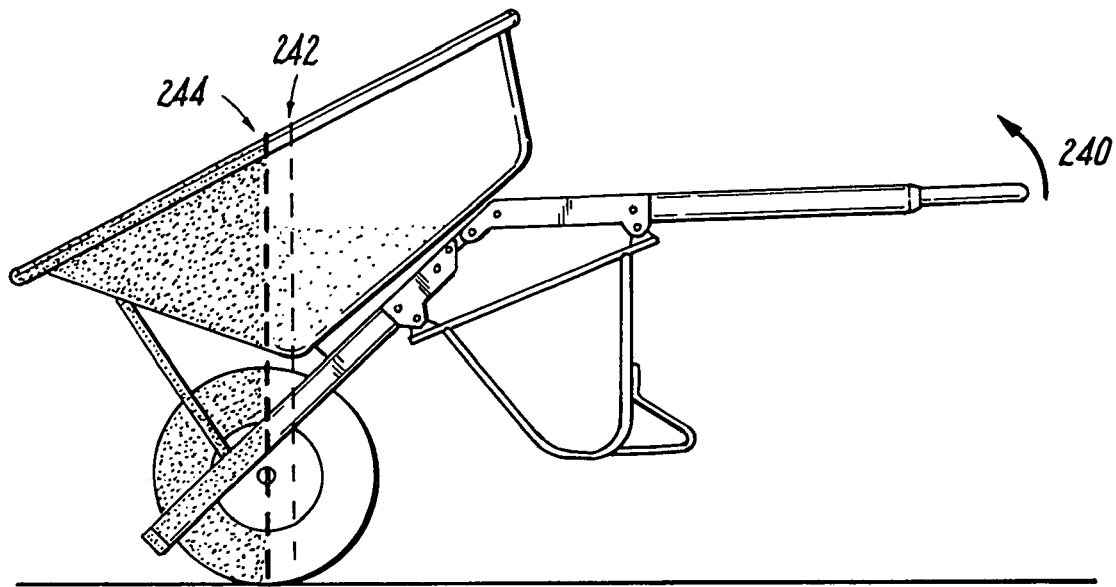
FIG. 11 is an elevational side view of the cart shown in FIG. 8 with the handle assembly lifted up.
Figure 12:
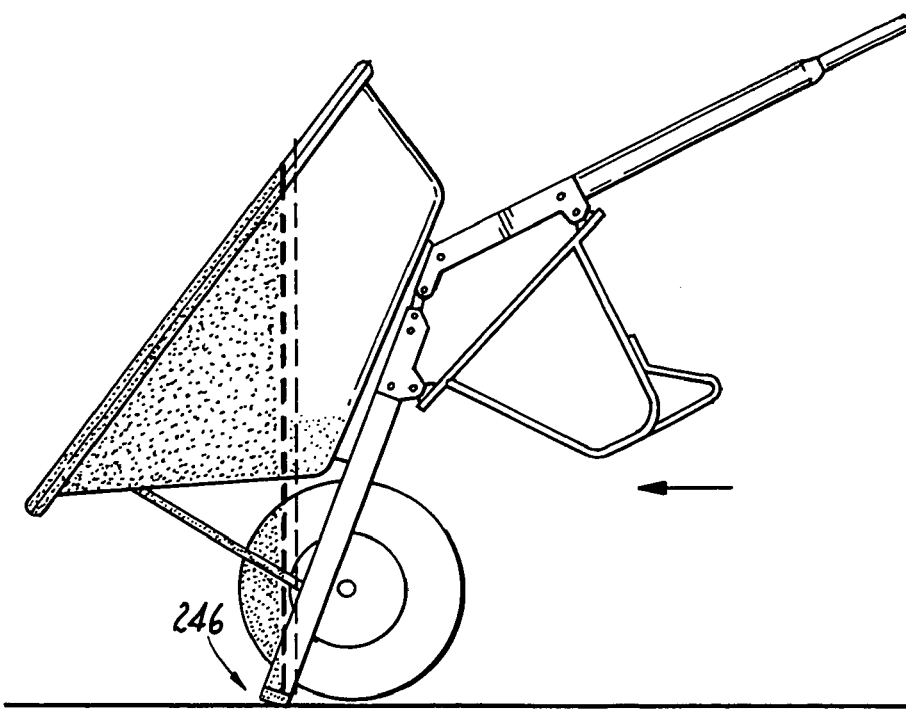
FIG. 12 is an elevational side view of the cart shown in FIG. 8 with the cart set for dumping.
Figure 13:
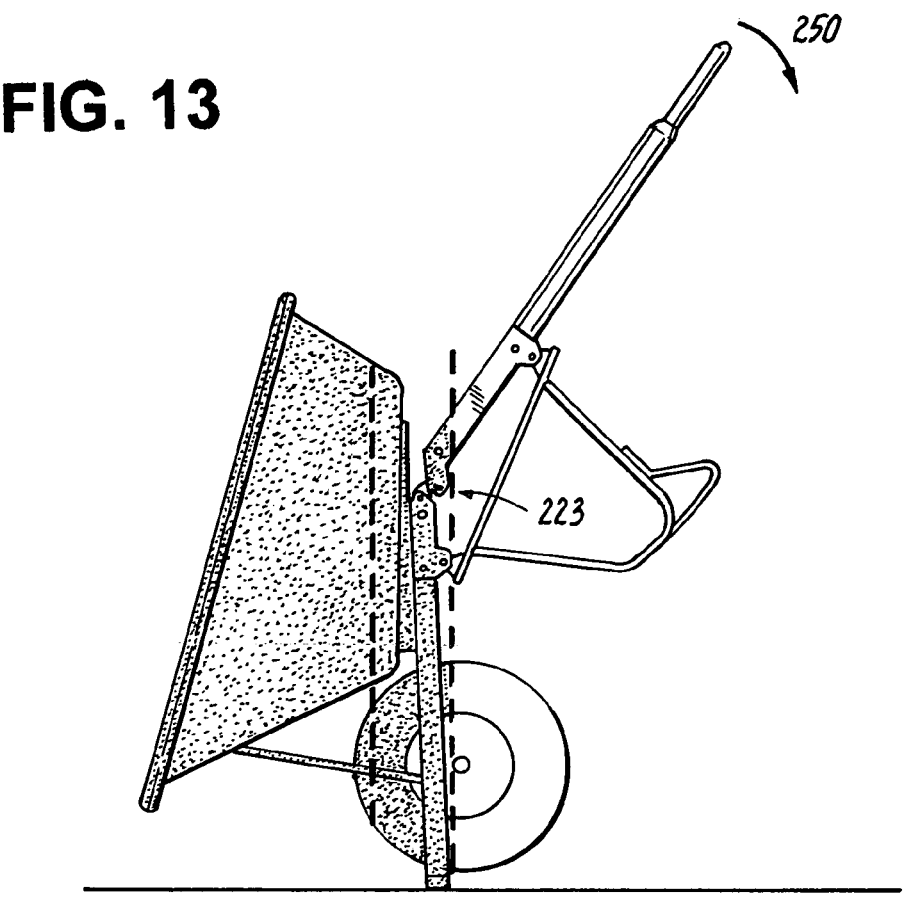
FIG. 13 is an elevational side view of the cart shown in FIG. 8 with the cart shown unlocked.

As shown in FIG. 11, the user then applies an upward pressure 240 to the user manipulation end 34 of the handle assembly 22 of the cart 20 wherein the bucket 28 angularly tips up at the rearward extremity to a dumping orientation. FIG. 11 shows the center of gravity point 242 and the break-over point 244. The weight of the load 206 then assists in pulling down the bucket 28. FIG. 12 shows the cart 20 set for dumping. The cart has a new ground breaking point 246.

Figure 14:
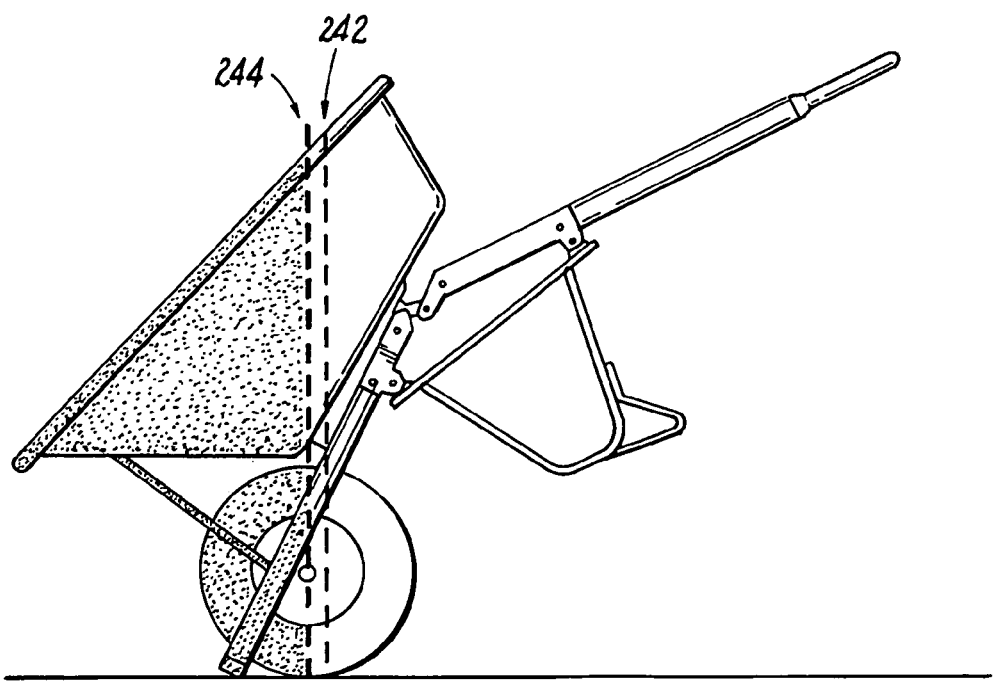
FIG. 14 is an elevational side view of the cart shown in FIG. 8 with the cart being placed back toward resting position.
Figure 15:
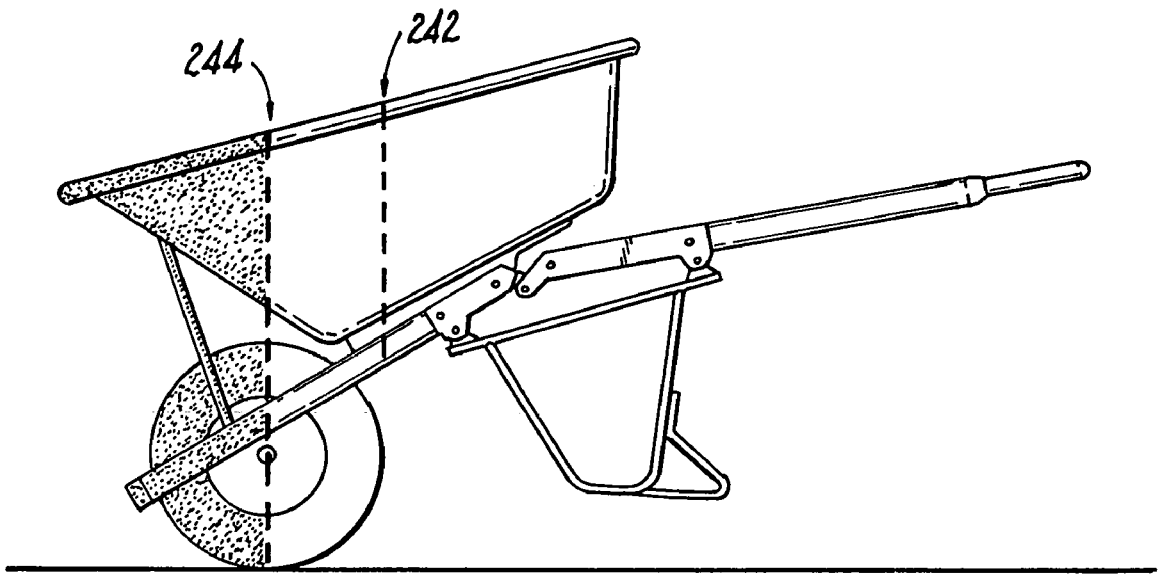
FIG. 15 is an elevational side view of the cart shown in FIG. 8 with the cart being placed back toward resting position.
Figure 16:
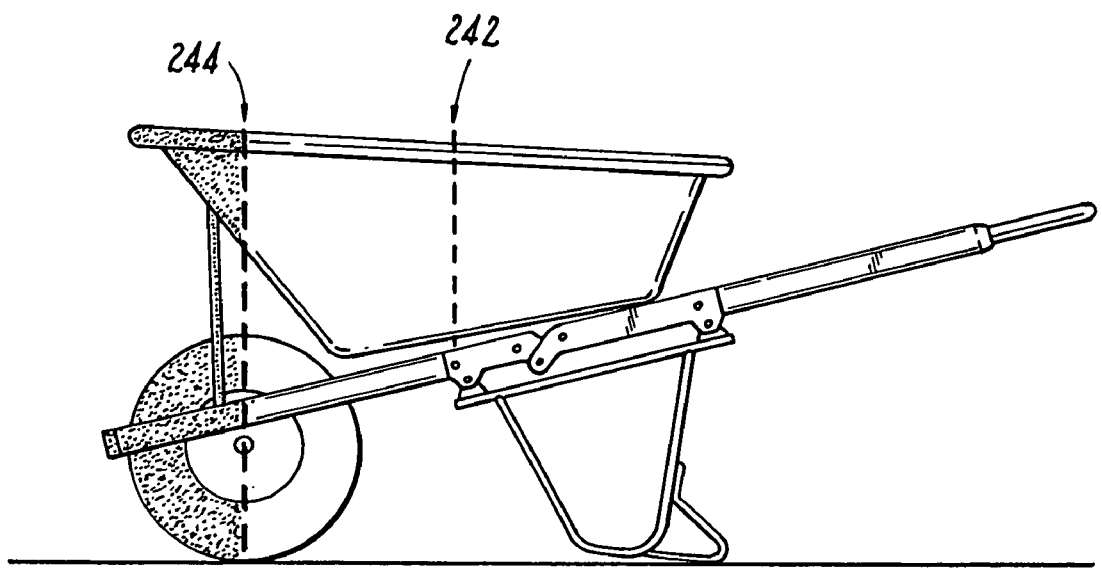
FIG. 16 is an elevational side view of the cart shown in FIG. 8 with the cart in a resting orientation.

FIGS. 13-16 show the user moving 250 the user manipulation end 34 of the handle assembly 22 of the cart 20 downward to return the cart 20 to the starting position by which point the locking device 223 releases the handle assembly 22 to return the handle assembly 22 to the standard position from the leveraged position. FIGS. 14-16 show the break over point 244 and the center of gravity point 242 moving as the cart 20 is moved back to its starting orientation.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for a user to dump a cart comprising the steps of:
   a) positioning said cart in a starting position with a bucket generally level and a ground contacting assembly and ground support wheel in contact with the ground;
   b) applying a downward pressure to a user manipulation end of a handle assembly of said cart;
   c) moving downwardly said user manipulation end of said handle assembly;
   d) pivoting said bucket upward at a rearward extremity relative to said ground contacting assembly;
   e) locking said handle assembly in a leveraged position relative to said ground contacting assembly;
   f) applying an upward pressure to said user manipulation end of said handle assembly of said cart;
   g) tipping said bucket up at said rearward extremity to a dumping orientation;
   h) unlocking said handle assembly;
   i) moving said user manipulation end of said handle assembly of said cart downward;
   j) returning said cart to said starting position
   k) returning said handle assembly to a standard position from said leveraged position.

2. The method defined in claim 1 wherein during said applying of said downward pressure to said user manipulation end of said handle assembly said ground support wheel and said ground contacting assembly remain at a uniform spacing.

3. The method defined in claim 1 wherein during said applying of said downward pressure to said user manipulation end of said handle assembly said ground support wheel moves toward said ground contacting assembly.

4. The method defined in claim 1 wherein said bucket further comprises a center of balance between said ground support wheel and said user manipulation end of said handle assembly and wherein said handle assembly further comprises a leveraging position distal from said user manipulation end and wherein said leveraging position of said handle assembly acts upon said bucket on said user manipulation end of said handle assembly side of said center of balance of said bucket during said applying of said downward pressure to said user manipulation end of said handle assembly.

5. The method defined in claim 1 wherein said cart further comprises ground support wheel rotation blocking device for preventing rotation of said ground support wheel relative to said bucket during said applying of said upward pressure to said user manipulation end of said handle assembly while said bucket angularly tips up at said rearward extremity to said dumping orientation.

6. The method of claim 1 further comprising:
   ejecting contents of said cart away from said cart.

7. A method for dumping a cart comprising:

positioning said cart in a resting orientation with a bucket generally level and a ground contacting assembly and ground support wheel in contact with the ground;

applying a downward pressure to a user manipulation end of a handle assembly of said cart;

moving said user manipulation end of said handle assembly downward;

pivoting upward said bucket at a rearward extremity relative to said ground contacting assembly;

pivoting downward said bucket at a forward extremity until a locking device locks said handle assembly in a leveraged position relative to said ground contacting assembly;

applying an upward pressure to said user manipulation end of said handle assembly of said cart;

tipping said rearward extremity of said bucket to a dumping orientation;

moving said user manipulation end of said handle assembly of said cart downward to return said cart to a starting position by which point said locking device releases said handle assembly to return said handle assembly to a standard position from said leveraged position.

* * * * *